US012196246B2

(12) United States Patent
Wang

(10) Patent No.: US 12,196,246 B2
(45) Date of Patent: Jan. 14, 2025

(54) REPLACEABLE QUICK CONNECTOR

(71) Applicant: NINGBO VEALITE ILLUMINATION CO., LTD, Ningbo (CN)

(72) Inventor: Binghao Wang, Ningbo (CN)

(73) Assignee: NINGBO VEALITE ILLUMINATION CO., LTD

( * ) Notice: Subject to any disclaimer, the term of this patent is extended or adjusted under 35 U.S.C. 154(b) by 183 days.

(21) Appl. No.: 18/113,064

(22) Filed: Feb. 23, 2023

(65) Prior Publication Data

US 2023/0193942 A1 Jun. 22, 2023

(30) Foreign Application Priority Data

Jan. 5, 2023 (CN) .......................... 202320014776.3

(51) Int. Cl.
*F16B 39/12* (2006.01)

(52) U.S. Cl.
CPC .................... *F16B 39/12* (2013.01)

(58) Field of Classification Search
CPC .......... F16B 39/08; F16B 39/10; F16B 39/12; Y10S 411/925–926; Y10S 411/931
USPC .......................... 411/204, 221, 222
See application file for complete search history.

(56) References Cited

U.S. PATENT DOCUMENTS

| 2002/0164900 A1* | 11/2002 | Youtsey | H01R 9/0527 |
| | | | 439/578 |
| 2016/0020557 A1* | 1/2016 | Daoura | H01R 13/6205 |
| | | | 439/38 |
| 2017/0062974 A1* | 3/2017 | Daoura | H01R 13/6205 |
| 2018/0051838 A1 | 2/2018 | Hamon et al. | |
| 2018/0119859 A1 | 5/2018 | Lee et al. | |
| 2019/0063655 A1 | 2/2019 | Chen | |
| 2019/0107234 A1* | 4/2019 | Corbett | F16L 37/0987 |

* cited by examiner

*Primary Examiner* — Roberta S Delisle
(74) *Attorney, Agent, or Firm* — Jose Cherson Weissbrot

(57) ABSTRACT

The present disclosure relates to a replaceable quick connector, which includes a connector board, a connector base, a circuit board and a locking nut, where a bottom center of the connector board extends downwards to form a plugging column, two clamping blocks are disposed on an outer wall of the plugging column, clamping convex points are formed in upper parts of the clamping blocks, the clamping blocks are arranged in relative to 180 degrees, a clamping sheet is disposed at a top of the connector base, a plugging hole for plugging the plugging column is formed in a center of the clamping sheet, the plugging hole extends inwards to form two clamping bases, the clamping bases are arranged in relative to 180 degrees.

7 Claims, 3 Drawing Sheets

REPLACEABLE QUICK CONNECTOR

TECHNICAL FIELD

The present disclosure relates to a quick connector.

BACKGROUND

An inductive switch is a component, which can turn on and turn off a circuit to realize switch functions by receiving an infrared ray released from the human body. Since the switch functions can be realized without touching the inductive switch directly, the inductive switch is more convenient to use; and therefore the inductive switch is widely applied in lamps, sliding doors, air conditioners and various devices. The interaction between the inductive switch and a device is mainly realized through a quick connector. At present, the quick connector on the market is mainly composed of a connector board and a connector base, a top surface of the connector board is connected to the inductive switch, a threaded column is disposed on a bottom surface of the connector board, an inductive pin is disposed at a bottom of the threaded column, a threaded hole is formed in the connector base, a circuit board is disposed in the threaded hole, an inductive contact is disposed on the circuit board, and after the connector board is in rotationally connected to the connector base through the cooperation of the threaded column and the threaded hole, the inductive pin contacts with the inductive contact mutually, and the circuit is conducted. The quick connector has the following two problems: first, in order to ensure the firm installation of the quick connector, the threaded column and the threaded hole are generally longer; during installation, the threaded column and the threaded columns need to be rotated for many times, so that the quick connector can be installed in place, which is time-consuming and force-consuming, and at the same time the longer threaded column and the threaded hole enable the whole quick connector to have a large volume, so as not to be applied in small devices. Second, after the quick connector is dismounted for many times, the circuit board is prone to deflection, causing the inductive pin incapable of aligning and contacting with the inductive contact on the circuit board, and the circuit cannot be conducted.

SUMMARY

In view of defects of a quick connector of an existing inductive switch, the technical problem to be solved by the present disclosure is to provide a replaceable quick connector capable of installing a connector board and a connector base quickly; and at the same time, the fixation for a circuit board of the replaceable quick connector is more stable.

In order to implement the above purpose, according to one aspect of the present disclosure, the present disclosure is implemented by the following technical measures: a replaceable quick connector, including a connector board, a connector base, a circuit board and a locking nut, where a bottom center of the connector board extends downwards to form a plugging column, two clamping blocks are disposed on an outer wall of the plugging column, clamping convex points are formed in upper parts of the clamping blocks, the clamping blocks are arranged in relative to 180 degrees, a clamping sheet is disposed at a top of the connector base, a plugging hole for plugging the plugging column is formed in a center of the clamping sheet, the plugging hole extends inwards to form two clamping bases, the clamping bases are arranged in relative to 180 degrees, clamping slots for clamping the clamping blocks are disposed at one sides of the clamping bases, clamping concave points for clamping the clamping convex points are formed in the clamping slots, threads are disposed at outer walls of the clamping bases, and the locking nut is sleeved at the threads of the outer walls of the clamping bases.

Preferably, two limiting columns are disposed at a bottom of the plugging column, and the limiting columns and the clamping blocks are not on the same straight line.

Preferably, a plurality of inductive domes are disposed at one sides of the two limiting columns, and the inductive domes are lined up.

Preferably, inductive contacts corresponding to the inductive domes and limiting slots corresponding to the limiting columns are disposed on the circuit board.

Preferably, the inductive contacts are located in a middle of the circuit board, and two groups of inductive contacts are preferred.

Preferably, a sealing ring is disposed between the connector board and the connector base, as well as between the connector base and the locking nut.

Preferably, a dome is respectively disposed at two sides of an outer wall of each clamping base, a lug boss is disposed in each dome, and the circuit board is installed in the connector base through the mutual cooperation of the clamping bases and the lug boss. The fixation for the circuit board designed above is more stable.

Compared with the prior art, the present disclosure has the following advantages: the connection for the connector board and the connector base is more compact, the installation is quicker and more convenient, at the same time the inductive domes can contact with the inductive contacts on the circuit board accurately through the cooperation of the limiting columns and the limiting slots, so as to avoid a situation that the inductive domes and the inductive contacts cannot be contacted and conducted.

BRIEF DESCRIPTION OF THE DRAWINGS

The drawings, which constitute a part of the present disclosure, are used to provide a further understanding of the present disclosure, and the exemplary embodiments of the present disclosure and the description thereof are used to explain the present disclosure, but do not constitute improper limitations to the present disclosure. In the drawings

Figure 1:
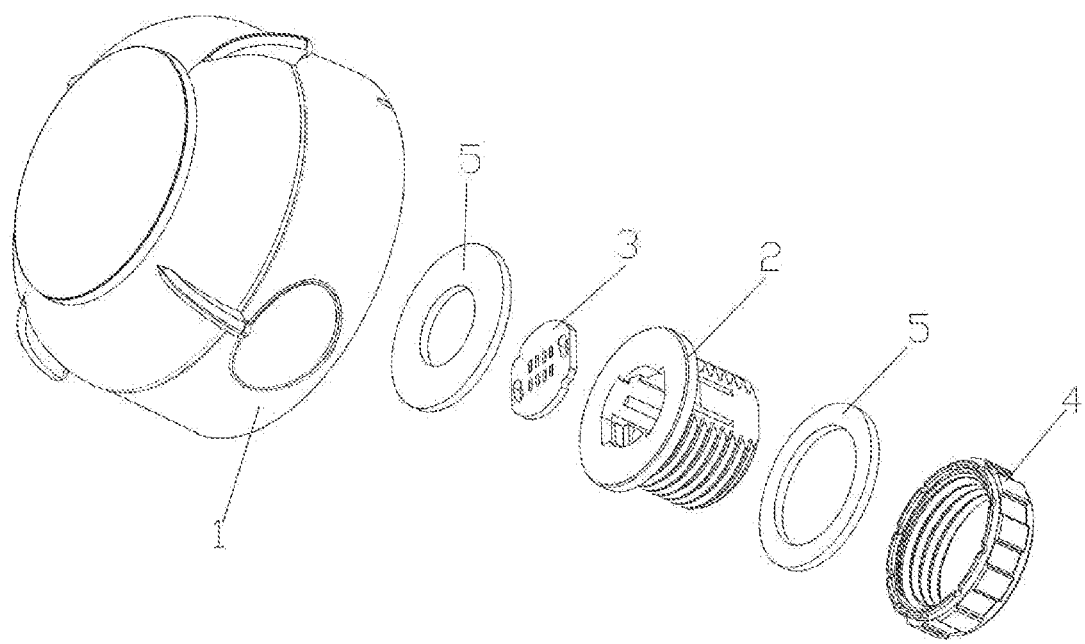
FIG. 1 is an exploded drawing of a replaceable quick connector part of the present disclosure.

Reference signs: 1. Connector board, 2. Connector base, 3. Circuit board, 4. Locking nut, 5. Sealing ring, 6. Plugging column, 7. Clamping block, 8. Clamping convex point, 9. Clamping sheet, 10. Plugging hole, 11 Clamping base, 12 Clamping slot, 13 Clamping concave point, 14. Limiting column, 15. Inductive dome, 16. Inductive contact, 1. Limiting slot, 18. Dome, 19. Lug boss.

DETAILED DESCRIPTION OF THE EMBODIMENTS

The present disclosure will be described below in detail with reference to drawings and in combination with the embodiments. It is noted that embodiments in the present disclosure and features in the embodiments may be combined with each other without conflict.

In the description of the present disclosure, it is understood that orientation or position relationships indicated by the terms "center, "upper", "lower", "left", "right", "vertical", "horizontal", "inner", "outer", "bottom", "top" and the like are based on the orientation or position relationships as shown in the drawings, for ease of describing the present disclosure and simplifying the description only, rather than indicating or implying that the mentioned apparatus or element necessarily has a particular orientation and must be constructed and operated in the particular orientation. Therefore, these terms should not be understood as limitations to the present disclosure.

Embodiment 1

Figure 2:
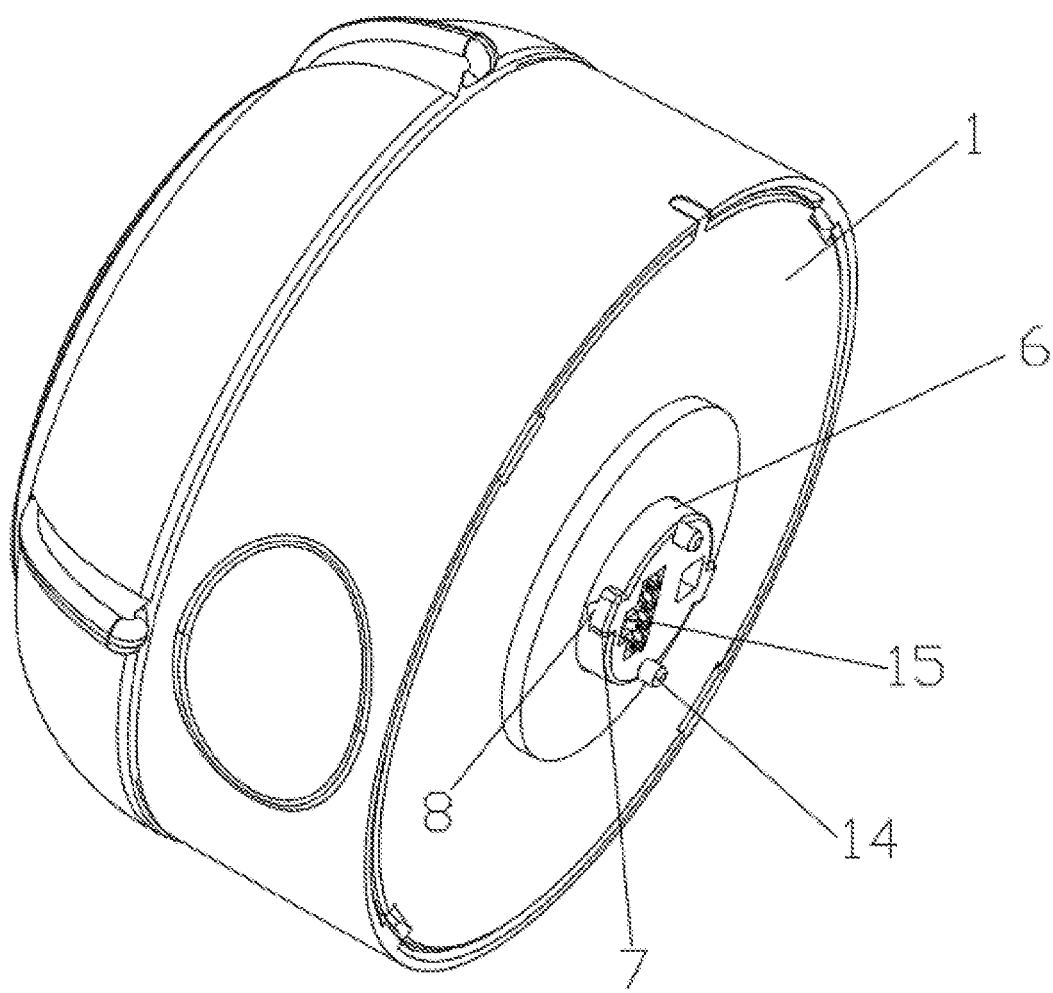
FIG. 2 is a schematic diagram of a connector board structure of the present disclosure.
Figure 3:
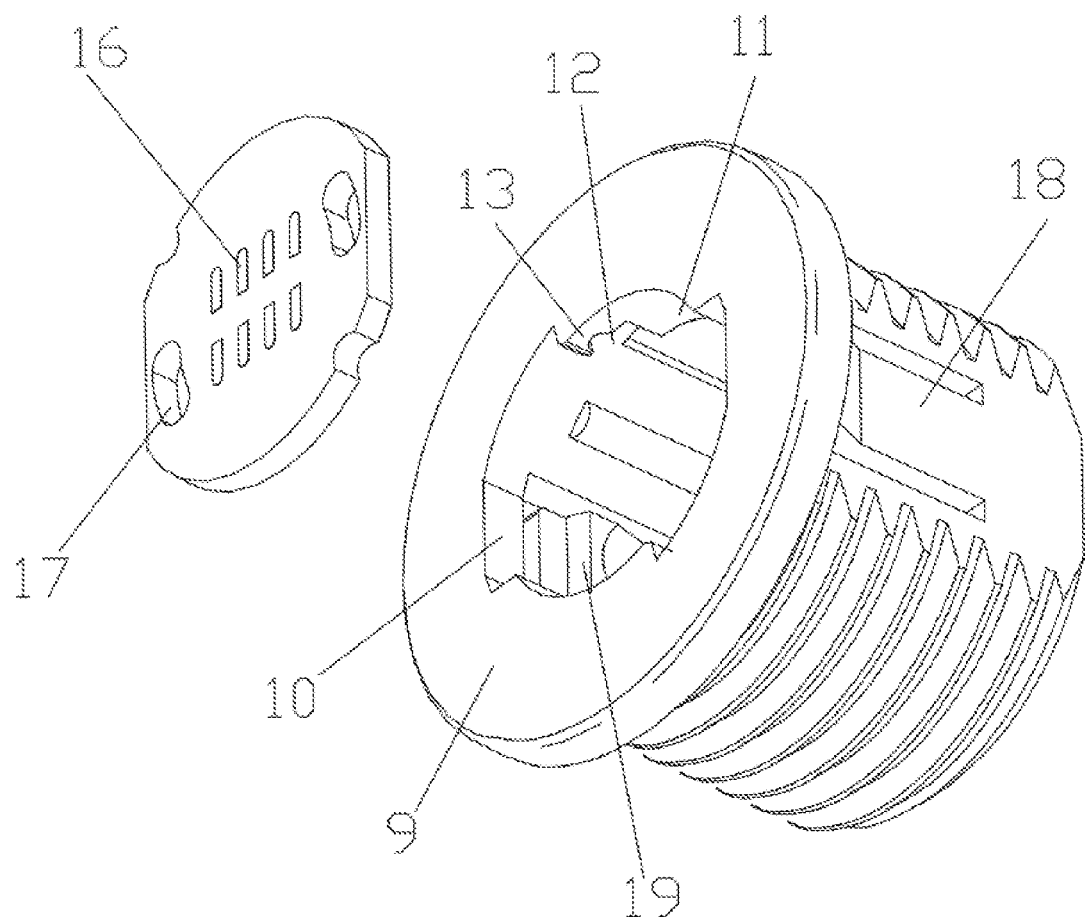
FIG. 3 is a schematic diagram of a connector base structure of the present disclosure.

Please refer to FIG. 1, this embodiment provides a replaceable quick connector, which is composed of a connector board 1, a sealing ring 5, a circuit board 3, a connector base 2 and a locking nut 4. In combination with FIG. 2 for continuous description, a top surface of the above connector board 1 is connected to an inductive switch, a bottom center of the connector board 1 extends downwards to form a plugging column 6, limiting columns 14 are disposed at a bottom of the plugging column 6, two limiting columns 14 are preferred and disposed in relative to 180 degrees, a plurality of inductive domes 15 are disposed at one sides of the two limiting columns 14, four inductive domes 15 are preferred and lined up, clamping blocks 7 are disposed on an outer wall of the plugging column 6, clamping convex points 8 are disposed at upper parts of the clamping blocks 7, two clamping blocks 7 are preferred and disposed in relative to 180 degrees, and the clamping blocks 7 and the limiting columns 14 are not on the same straight line. In combination with FIG. 3 for continuous description, the connector base 2 is cylindrical, an interior of the connector base 2 is hollow, threads are disposed on an outer wall of the connector base 2, a dome 18 is respectively disposed at two sides of the outer wall, a lug boss 19 is disposed inside the dome 18, a clamping sheet 9 is disposed at a top of the connector base 2, a plugging hole 10 is formed in a center of the clamping sheet 9, the plugging hole 10 extends inwards to form two arc-shaped clamping bases 11, clamping slots 12 are disposed at one sides of the clamping bases 11, clamping concave points 13 are disposed in the clamping slots 12, and the clamping bases 11 are arranged in relative to 180 degrees. The circuit board 3 is installed in the connector base 2 through mutual cooperation of the clamping bases 11 and the lug boss 19, inductive contacts 16 corresponding to the inductive domes 15 the limiting slots 17 corresponding to the limiting columns 14 are disposed on the circuit board 3, the inductive contacts 16 are located in a middle of the circuit board 3, and two groups of inductive contacts 16 are provided.

During use, the connector base 2 is fixed on a device and locked through the locking nut 4, and then the limiting columns 14 of the connector board 1 are aligned to the limiting slots 17 so that the plugging column 6 is inserted into the plugging hole 10; the connector board 1 is rotated, so that the clamping blocks 7 on the connector board 1 enter into the clamping slots 12, the clamping blocks 7 and the clamping convex points 8 fit with the clamping concave points 13 so that the clamping blocks 7 are fixed in the clamping slots 12, at the same time the limiting columns 14 drives the circuit board 3 to rotate for fine adjustment, so that the inductive domes 15 just contact with one group of inductive contacts 16 on the circuit board 3, and the circuit is conducted; and the sealing ring 5 is clamped between the connector board 1 and the connector base 2 as well as between the connector base 2 and the locking nut 4 for sealing the quick connector.

Through the above structure design, the connection for the connector board and the connector base is more compact, the installation is quicker and more convenient, at the same time the inductive domes can contact with the inductive contacts on the circuit board accurately through the cooperation of the limiting columns and the limiting slots, so as to avoid a situation that the inductive domes and the inductive contacts cannot be contacted and conducted.

The above is the only preferred embodiment of the present disclosure and is not intended to limit the present disclosure. Those skilled in the art may make various modifications and variations. Any modifications, equivalent replacements, improvements and the like made within the spirit and principle of the present disclosure shall fall within the scope of protection of the present disclosure.

What is claimed is:

1. A replaceable quick connector, comprising a connector board, a connector base, a circuit board and a locking nut, wherein a bottom center of the connector board extends downwards to form a plugging column, two clamping blocks are disposed on an outer wall of the plugging column, clamping convex points are formed in upper parts of the clamping blocks, the clamping blocks are arranged in relative to 180 degrees, a clamping sheet is disposed at a top of the connector base, a plugging hole for plugging the plugging column is formed in a center of the clamping sheet, the plugging hole extends inwards to form two clamping bases, the clamping bases are arranged in relative to 180 degrees, clamping slots for clamping the clamping blocks are disposed at one sides of the clamping bases, clamping concave points for clamping the clamping convex points are formed in the clamping slots, threads are disposed at outer walls of the clamping bases, and the locking nut is sleeved at the threads of the outer walls of the clamping bases.

2. The replaceable quick connector according to claim 1, wherein two limiting columns are disposed at a bottom of the plugging column, and the limiting columns and the clamping blocks are not on the same straight line.

3. The replaceable quick connector according to claim 2, wherein a plurality of inductive domes are disposed at one sides of the two limiting columns, and the inductive domes are lined up.

4. The replaceable quick connector according to claim 3, wherein inductive contacts corresponding to the inductive domes and limiting slots corresponding to the limiting columns are disposed on the circuit board.

5. The replaceable quick connector according to claim 4, wherein the inductive contacts are located in a middle of the circuit board, and two groups of inductive contacts are preferred.

6. The replaceable quick connector according to claim 1, wherein a sealing ring is disposed between the connector board and the connector base, as well as between the connector base and the locking nut.

7. The replaceable quick connector according to claim 1, wherein a dome is respectively disposed at two sides of an outer wall of each clamping base, a lug boss is disposed in each dome, and the circuit board is installed in the connector base through mutual cooperation of the clamping bases and the lug boss.

\* \* \* \* \*